United States Patent [19]

Basire et al.

[11] 4,186,301
[45] Jan. 29, 1980

[54] AUTOMATIC FOCUS CONTROL FOR A MICROSCOPE

[75] Inventors: Alain Basire, Versailles; Pierre Roche, Maisons Alfort; Jean Thenard, Versailles, all of France

[73] Assignee: Commissariat a l'Energie Atomique, Paris, France

[21] Appl. No.: 894,003

[22] Filed: Apr. 6, 1978

[30] Foreign Application Priority Data

Apr. 5, 1977 [FR] France .................. 77 10277

[51] Int. Cl.² .................. G02B 21/00; H04N 5/26; H04N 7/18
[52] U.S. Cl. .................. 250/204; 358/227; 358/93
[58] Field of Search .................. 358/227, 93; 350/46, 350/47; 250/208, 209, 204; 354/25; 352/140

[56] References Cited

U.S. PATENT DOCUMENTS

| 3,883,689 | 5/1975 | Mansour et al. | 358/227 |
| 3,967,056 | 6/1976 | Yata et al. | 358/227 |

Primary Examiner—John C. Martin
Attorney, Agent, or Firm—Cameron, Kerkam, Sutton, Stowell & Stowell

[57] ABSTRACT

A process and apparatus for the automatic correction of the focusing of a microscope in an image plane utilizes two microscope outputs forming two images of the same object in two different planes surrounding the image plane and two matrices with at least one line of N photodetectors receiving the two images. A contrast measuring circuit of each image is associated with each matrix and a comparator of the signals is used for the two contrast measuring circuits. Connected to the output of the comparator is a circuit for the formation of a correction signal and the microscope is focused by the correction signal.

7 Claims, 10 Drawing Figures

AUTOMATIC FOCUS CONTROL FOR A MICROSCOPE

BACKGROUND OF THE INVENTION

The present invention relates to a process for the automatic correction of the focusing of a microscope and to an apparatus for performing said process. A particular application of the invention is to the field of medical analysis, particularly when it is desired to count the blood cells.

In processes and apparatus for the automatic analysis of images given by a microscope, it is frequently necessary to correct during the analysis the focusing of said microscope. Thus, the thickness of the slides carrying the preparations to be analysed is not generally constant and the focusing effected for a particular zone of said slide may no longer be correct for a neighbouring zone. It is therefore necessary to correct the focusing during the displacement of the slide beneath the objective of the microscope. Even if the pre-analysis focusing can be performed manually by the operator, this is not the case for the corrective focusing during analysis which must preferably be rendered automatic if the full benefits of the automatic nature of the actual analysis is to be obtained.

Processes and apparatus are already known for the automatic correction of the focusing of a microscope. In general manner, these processes comprise performing an analysis of an image which the microscope gives to an object for a given focus control, and correcting said focus control to give the maximum contrast to the image. Such process and apparatus are described in DOS 2,500,714 filed on 9.1.1975 and U.S. Pat. 3,967,056 granted on 29.6.1976.

In said processes and apparatus two successive focus controls of the same image are compared by measuring the contrasts of the two images obtained. It is therefore necessary for memory storage means for the contrast measurements to be provided to enable such a comparison to take place. Moreover, correction can only take place when two image analyses have been performed. As a result said processes and apparatus are slow.

BRIEF SUMMARY OF THE INVENTION

The object of the present invention is a process and an apparatus which obviates this disadvantage. Consequently the invention provides for the simultaneous formation of two images of the same object in two different image planes. When the focusing of the microscope is optimum for the plane located in the centre of said two image planes, the focus controls of both images are the same. According to the invention, the contrasts of the two images formed are compared and the microscope focusing is corrected so that the two contrasts are identical.

The significance of the invention is to increase the speed of correction because the comparison is no longer performed between two successive images but instead between two simultaneous images.

More precisely the invention has for its object a process for the automatic correction of the focusing of a microscope in an image plane wherein:

two images of the same object are formed through two microscope outputs, said two images being formed in two different planes surrounding the image plane;

the light intensity of the different points of the two images is detected by means of two photo-detector matrices;

on the basis of the signals contained in each of the photo-detectors the contrast of the two images is measured;

the two measured contrasts are compared;

a correction signal is produced which is a function of the variation between the said two contrasts;

by means of the said signal the microscope focusing correction means are operated so as to eliminate the variation.

Preferably the correction means comprise a motor and the rotation of the motor is controlled by producing a fixed amplitude signal which is transmitted to the motor when a variation exists between the contrasts.

The present invention also has for its object an apparatus for the automatic correction of the focusing of a microscope in an image plane wherein it comprises:

two microscope outputs forming two images of the same object in two different planes surrounding said image plane;

two matrices with at least one line of N photodetectors receiving the two images formed by the microscope;

a contrast measuring circuit of each image associated with each matrix;

a comparator of the signals supplied by the two contrast measuring circuits;

a circuit for the formation of a correction signal connected to the output of the comparator;

means for correcting the focusing of the microscope controlled by said signal.

Preferably the focusing correction means comprise a motor and the correction signal formation circuit comprises means for producing fixed amplitude pulses, a logic gate through which said pulses are directed to the motor, means for locking the logic gate when focusing is optimum and thus stopping the rotation of the motor, a bistable flip-flop circuit whose state determines the rotation direction of the motor and means for modifying the state of said flip-flop as a function of the direction of the disparity between the two contrasts.

BRIEF DESCRIPTION OF THE DRAWINGS

Further features and advantages of the present invention can be gathered from the following description of preferred but non-limitative embodiments, and with reference to the attached drawings, wherein show.

DETAILED DESCRIPTION OF THE PREFERRED EMBODIMENTS

Figure 1:
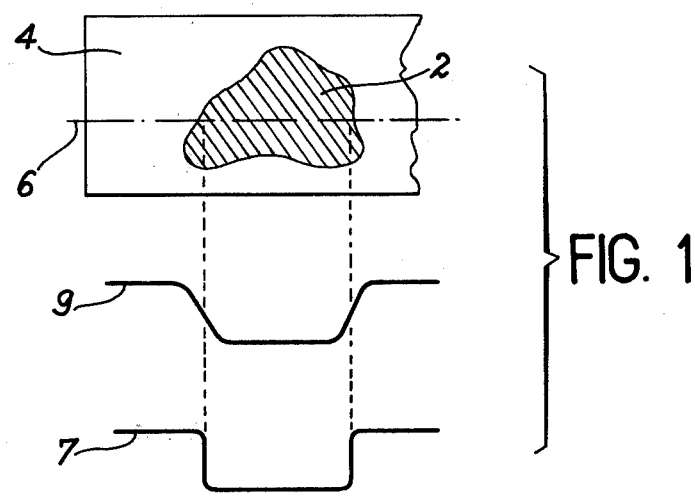
FIG. 1, diagrammatically how the slope of a background-image transition varies when the focusing of a microscope is modified.

FIG. 1 diagrammatically shows a dark cell 2 which stands out from the light background 4 of a supporting slide. The image is that given by a microscope whose focusing has been initially regulated, for example manually. This type of image is obtained when observing blood cells. Naturally as a function of the magnification value a larger or smaller number of cells may appear in the observation field.

If the light intensity of the different points of this image are measured along an arbitrary line 6, a signal is obtained whose course is represented in two cases by curves 7 and 9 of the lower part of FIG. 1. Such a signal consists of a plateau corresponding to the bright background and a hollow corresponding to the dark cell. The transition zone between the plateau and the hollow represents a more or less steep slope depending on whether the image is more or less clearly defined. When the focusing is correct said transition is abrupt as shown by curve 7. In other cases the slope is less steep as indicated by curve 9.

Figure 2:
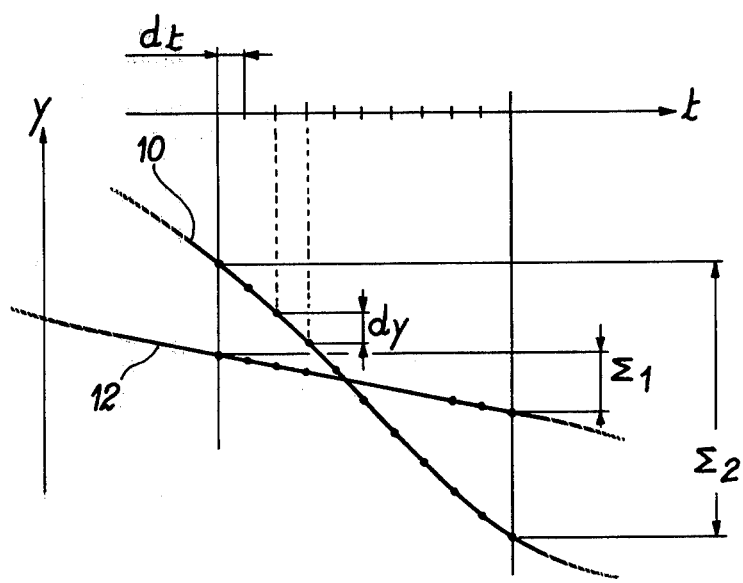
FIG. 2, a graph illustrating the way in which the transition slope is measured by measuring increments between different values of a signal.

In order to measure the slope of the transition between the bright zone and the dark zone the procedure indicated diagrammatically in FIG. 2 is adopted. This diagram represents two curves 10 and 12 of the variations in the light intensity Y along a line for two different focusing images. If the light intensity is measured by an analysis system along said line the curves also represent the variations of two electrical signals supplied by the analysis means of the two images, the abscissa axis representing time.

In order to measure the slope of each of the curves about a point, the elementary intensity rise dy corresponding to an elementary rise dt in the scanning time is measured. Thus slope dy/dt is known if dt is determined. To calculate the overall variations of the light intensity along the transition values dy/dt of the slopes obtained at all measuring points are then summated. Thus, a sum signal $(\Sigma dy/dt)_1$ is obtained for the first image and a signal $(\Sigma dy/dt)_2$ for the second different focusing image.

As in practice all the intervals dt are equal, it is sufficient to measure the sum of the elementary variations $\Sigma dy$ to obtain a value proportional to the transition slope.

As it is desired to measure the variations in light intensity along a complete line of the image and not only along a light-dark transition, the absolute value $|dy|$ of the elementary variations must be measured to permit the adding of all the variations, no matter what the transition direction. Thus, in practice expressions of the form $(\Sigma|dy|)_1$ and $(\Sigma|dy|)_2$ or in short form $\Sigma_1$ and $\Sigma_2$ are measured.

Thus the comparison of two different focusing images is the same as comparing the values of the sums $\Sigma_1$ and $\Sigma_2$ obtained for two images. The difference between the two sums obtained gives the amplitude and direction of the correction to be made to the microscope focusing as will be explained now with reference to FIGS. 3 and 4.

Figure 3:
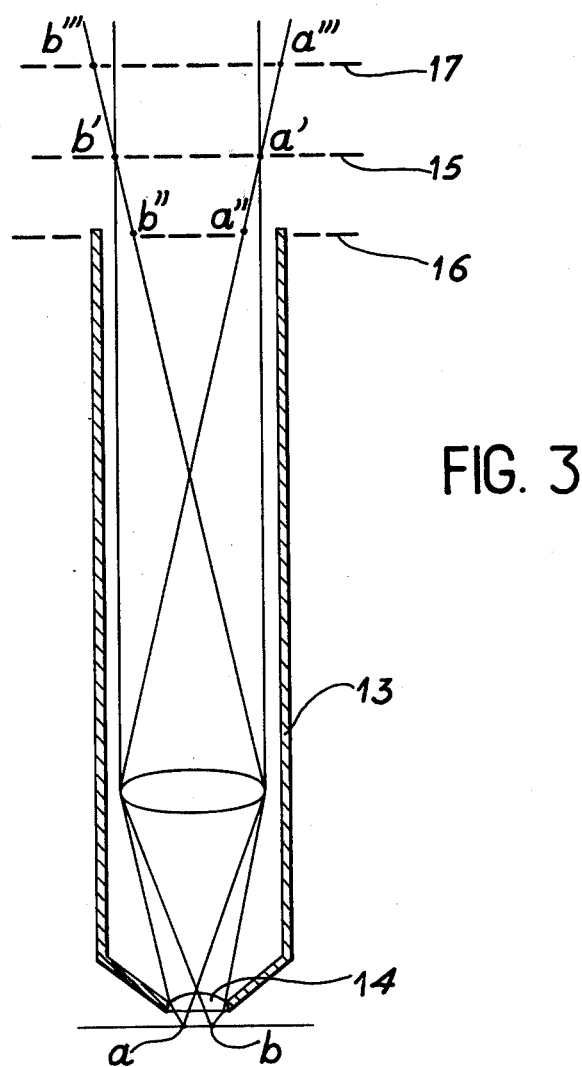
FIG. 3, the principle of formation of two images according to the invention.

FIG. 3 diagrammatically shows the optical tube 13 of a microscope with its objective 14 and two objects a and b. The image observation plane is 15 where images a' and b' of objects a and b are formed. In a plane 16 in front of image plane 15 are two other images a" and b" of the same objects and in a plane 17 located beyond said image plane are two further images a''' and b'''. On passing from plane 15 to plane 16 or to plane 17 the geometrical characteristics of the images obtained vary in inverse direction. This is in particular the case for the slope of transition between bright zones and dark zones. If there is an equality of the slopes for planes 16 and 17 this means that said slope represents an extreme in the image plane 15. However, if the slope for the images in plane 17 is steeper than that of slope 16 this means that plane 17 is closer to the correct image plane than plane 16. The comparison between the transition slopes in the two planes 16 and 17 therefore makes it possible to determine the position of image plane 15 and consequently perform a focusing correction.

Figure 4:
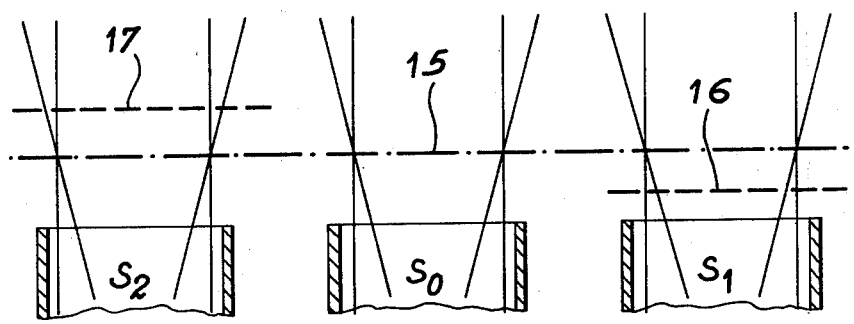
FIG. 4, diagrammatically the respective dispositions of the image planes of the microscope making it possible to form two control images of the focusing and one observation image in a median plane.

In practice the invention requires three microscope outputs $S_0$, $S_1$ and $S_2$ which are diagrammatically represented in FIG. 4. Output $S_0$ serves for the observation of the image obtained with a correct focusing whilst outputs $S_1$ and $S_2$ serve to measure the light intensity variations of the images obtained in the two planes 16 and 17 and consequently serve to form a correction signal.

Figure 5:
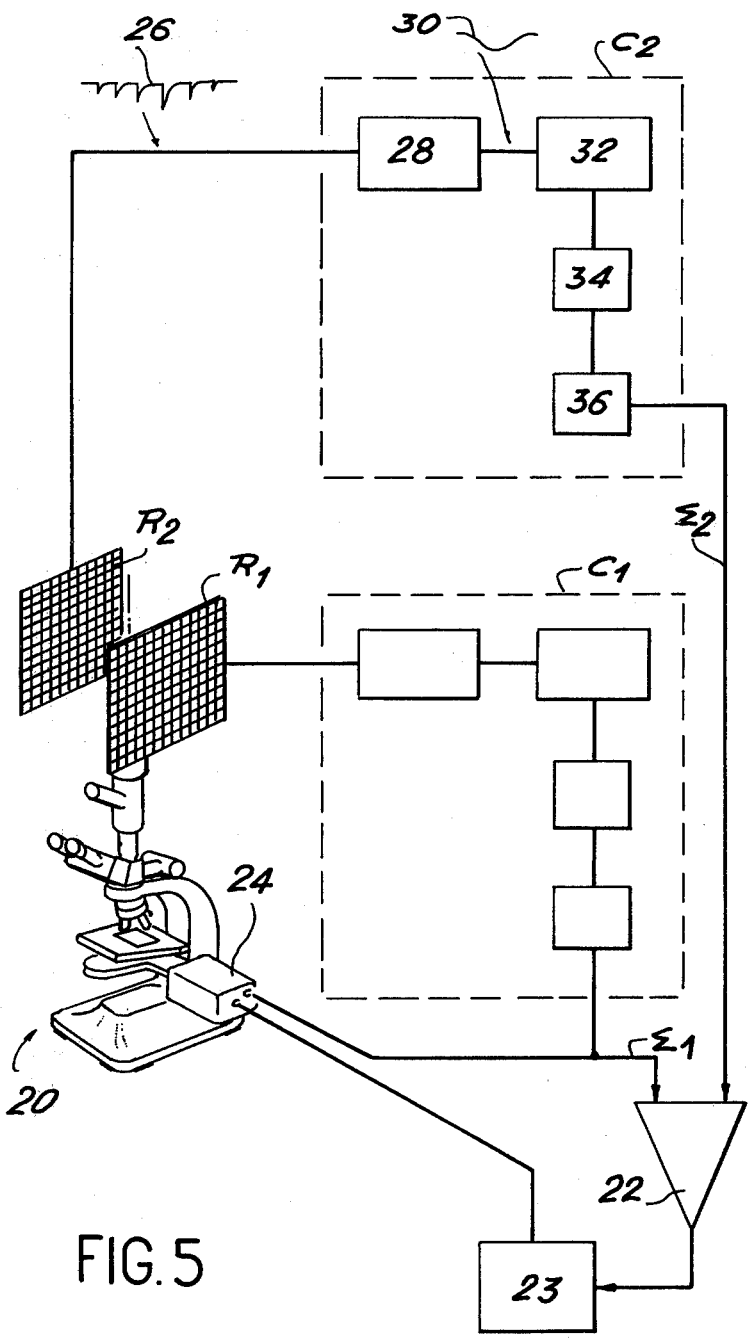
FIG. 5, a block diagram of the means used in the invention.

In FIG. 5 microscope 20, whose focusing is to be automatically corrected, has two measuring outputs associated with two image analysis networks $R_1$ and $R_2$ connected to two processing circuits $C_1$ and $C_2$ which supply at their output signals $\Sigma_1$ and $\Sigma_2$.

Signals $\Sigma_1$ and $\Sigma_2$ are compared in a comparator 22 connected to a circuit 23 for the formation of a correction signal which is a function of the variation between signals $\Sigma_1$ and $\Sigma_2$, said error signal being applied to a microscope focusing correction device 24. The optimum focusing setting is obtained when the signals supplied by the two circuits $C_1$ and $C_2$ are equal.

Each network $R_1$ and $R_2$ supplies a signal 26 which is formed from a sequence of pulses corresponding to the sequence of light intensities detected at different points of an image line.

Each of the circuits $C_1$ and $C_2$ comprise a circuit 28 which transforms signal 26 emitted by the network associated therewith into an envelope signal 30. An analogue-digital converter 32 samples signal 30 and supplies a digitally coded sample sequence. A circuit 34 measures the absolute value $|dy|$ of the increments between two successive samples. An adding circuit 36 effects the summation $\Sigma|dy|$ of the absolute values of the increments.

Following the complete analysis of an image line the sums $\Sigma_1$ and $\Sigma_2$ obtained are representative of light intensity variations of the two images.

Figure 6:
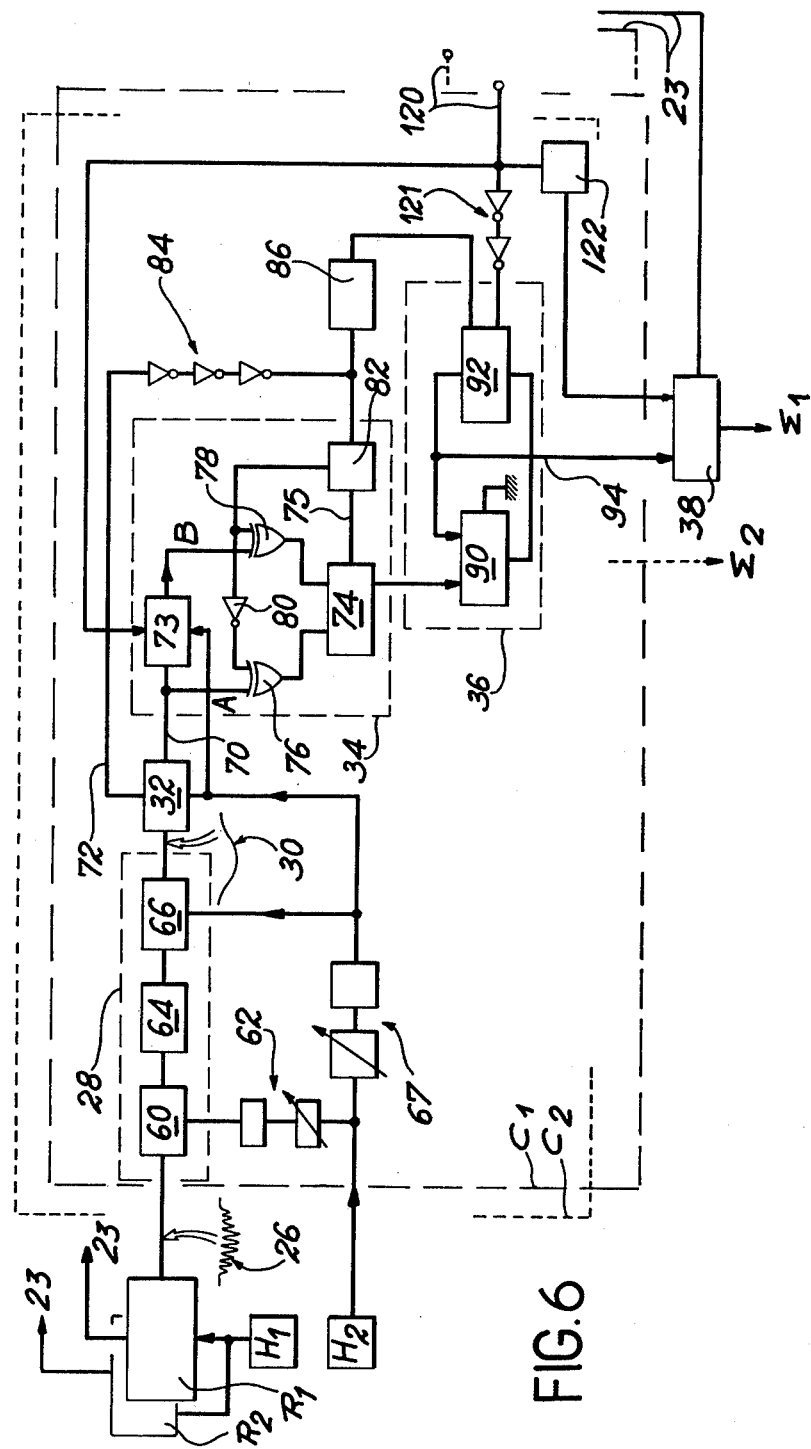
FIG. 6, in more detailed manner the circuits for calculating the sums $\Sigma_1$ and $\Sigma_2$ representing the contrast of the images.

FIG. 6 shows in a more detailed manner the structure of circuits $C_1$ and $C_2$. To facilitate comparison with the circuits of FIG. 5 the functional blocks already shown in said diagram the same references in FIG. 6.

The two detection networks $R_1$ and $R_2$ whose structure will be defined hereinafter are controlled by a clock $H_1$ which times the output of the pulses forming signal 26. Each network comprises a supplementary output 23 which carries an end of line scanning signal. As the two processing circuits $C_1$ and $C_2$ are identical only one will be described. Circuit 28 giving the envelope 30 of signal 26 can be of any per se known type. According to an advantageous variant it comprises an integration circuit 60 (controlled by a pair of monostable circuits 62 whereof one is regulatable in time), by a video amplifier 64 and by a sampling and holding circuit 66 (controlled by a pair of monostable circuits 67 whereof one is regulatable in time).

The monostable circuits 62 and the sampling and holding circuit 66 are controlled by a clock $H_2$. The time constant of circuit 60 is regulated to a value higher than the period separating two sampling operations in such a way that the system behaves like a circuit giving the envelope of the incident signal.

The timing rhythm at which the detection signals are extracted from networks $R_1$ and $R_2$ is determined by the frequency of clock $H_1$ and the sampling timing rhythm by the frequency $H_2$. The two frequencies can have a random relationship with one another but according to a simple variant they can be equal. In this case the two clocks $H_1$ and $H_2$ can be combined into a single clock.

Analogue signal 30 is converted into a sequence of digital samples by analogue-digital converter 32. The conversion is timed by means of clock $H_2$ and the monostable circuits 67. Output 70 of the converter carries the binary coded digital samples and a supplementary output 72 carries an end of conversion signal.

To calculate the absolute value of the increment between two successive samples, a circuit 34 is used which comprises a time lag register 73 whose input is connected to the output 70 of converter 32, an adder 74 having two inputs and a hold output 75, two logic gates of the OR-EXCLUSIVE type 76,78, an inversion gate 80 and a bistable memory circuit 82.

Circuit 34 operates as follows:

It calculates the absolute value of the difference $A-B$ of two successive samples A and B by carrying out one of the operations $A+\overline{B}+1$ or $\overline{A}+B+1$ depending on whether A is higher or lower than B, the bar signifying that there is a complement of 1 of the barred number. It is known that to effect the difference between two binary coded numbers A and B, the indicated operations can be performed, the choice of one or other of said operations depending on the presence of absence of a hold in the result of the operation $A+\overline{B}+1$. Circuit 74 receives at its two inputs numbers X and Y where X is either A, or $\overline{A}$ and where Y is either B, or $\overline{B}$ depending on the state of the logic gates 76 and 78 and it effects the operation $X+\overline{Y}+1$. The presence of absence of a hold in the result of the operation leads to a logic "1" or "0" signal on connection 75 which controls the state of the memory flip-flop 82. Each OR-EXCLUSIVE gates 76 and 78 therefore behaves like a programmable inversion circuit. Thus:

if a logic signal "1" is present at the output of flip-flop 82, said signal "1" is applied to one of the inputs of gate 78 and a signal 0 to one of of the inputs of gate 76. Thus gate 78 gives a bit "0" from a bit "1" and a bit "1" from a bit "0". Thus inversion takes place and number B is transformed into $\overline{B}$. Gate 76 gives a bit "0" from a bit "0" and a bit "1" from a bit "1". Thus it transmits A without change;

if a logic signal "0" is present at the output of flip-flop 82 said signal is applied to the control input of gate 78 which then transmits signal B without change, but gate 78 which is controlled by a signal "1" reverses the number A and supplies $\overline{A}$. Thus, at the input of adder 74 signals $A+\overline{B}$ or $\overline{A}+B$ are obtained depending on whether or not there is a hold at output 75. Thus circuit 34 gives the difference $|A-B|$.

At its output 72 analogue digital converter 32 supplies an end of conversion signal which is delayed and inverted by inverters 84 and is then applied to the memory flip-flop 82 so that circuit 34, which carries out the calculation of increments can be timed to the supply frequency of the digital samples.

The sum of the increments along an analysis line is effected by circuit 36 which comprises a digital adder 90 associated with a memory register 92 controlled by the end of conversion signal carried through inverters 84 and a time lag line 86. The operation of such a circuit is known. Adder 90 receives on the one hand the result of the calculation which has just been completed by circuit 34 for two samples and on the other the result of the calculation for the preceding samples which has been stored in register 92. Output 94 connected to the output of memory register 92 therefore gives at all times the sum $\Sigma|dy|$ of increments $|dy|$ calculated by circuit 34. At the end of scanning of a line this sum can be stored in a memory register 38 which is controlled by the end of scanning signal carried by connection 23.

The memory registers of this circuit, namely register 73 serving for the calculation of the elementary increments, and register 92 serving for the calculation of the sum of the increments are periodically zeroed by means of zero resetting pulses carried by connection 120 and applied at appropriate times to said registers, either directly in the case of register 73 or with a certain time lag given by the inverters 121 in the case of register 92, or by a monostable circuit 122 in the case of register 38.

Figure 7:
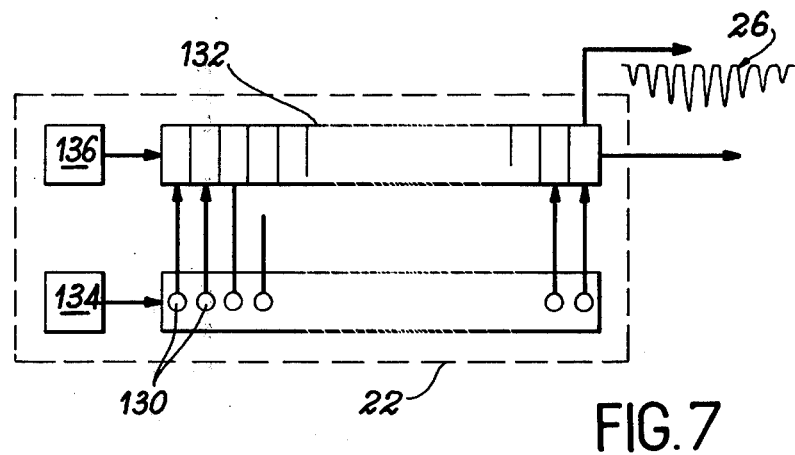
FIG. 7, diagrammatically a line of photodetectors associated with a charges coupled device.
Figure 8:
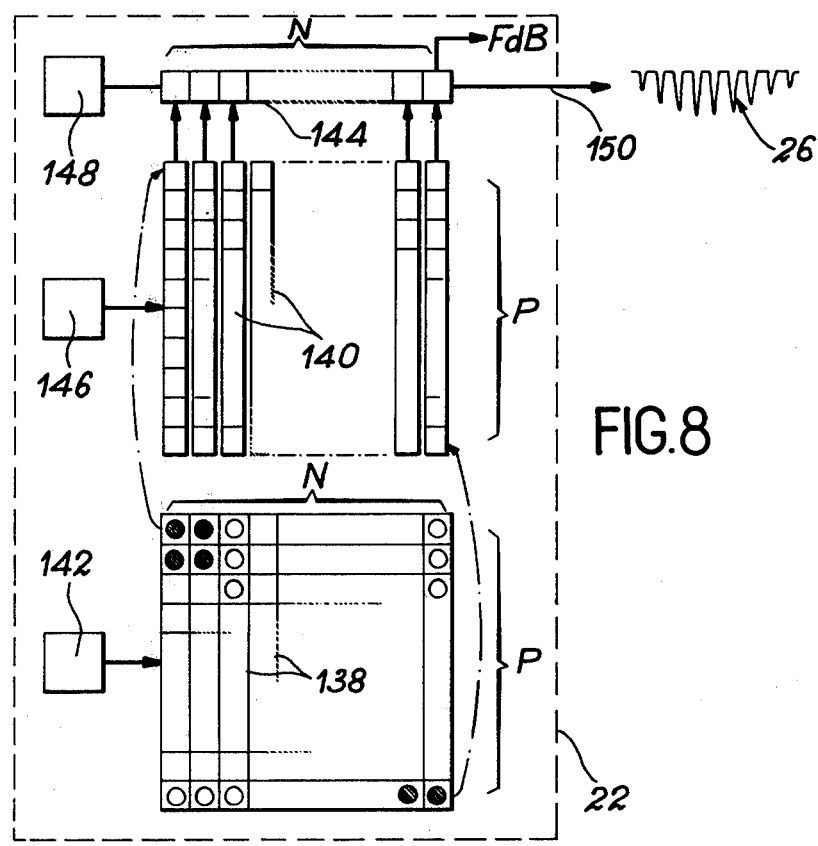
FIG. 8, diagrammatically a matrix of photodetectors associated with a group of charges coupled devices.

FIGS. 7 and 8 diagrammatically illustrate the structure of an image analysis network which can be used for the realisation of the invention.

According to a first embodiment, this network comprises a line of photodetectors 130 receiving one of the two analysis images given by the microscope. These photodetectors are advantageously photodiodes. The signals which they supply are transferred to a time lag register 132 which has the same number of points as there are photodiodes 130 and which is advantageously of the charges coupled device type. If N is the number of analysis points of an image line, the charges coupled device 132 will therefore have N points associated with N photodiodes.

A first clock 134 makes it possible to control the transfer of signals supplied by N photodiodes in N points of the charges coupled device 132. A second clock 136 controls the individual extraction of the data entered in the charges coupled device in order to form the signal 26 of which each peak represents the amplitude of the signal supplied by one of the photodiodes. The period of time separating two peaks of signal 26 is naturally equal to the cycle of clock 136 and the total scanning time of the line corresponds to the cycle of clock 134. Obviously clocks 134 and 136 can be constructed as a single clock equipped with appropriate frequency dividers.

The principle of such an image analysis device is known. It is advantageously possible to use the circuit marketed by the American Company "Reticon Corp." called the "C series solid state line scanners."

It is also possible to use a more complete analysis device than that indicated hereinbefore. According to the diagram of FIG. 8 it comprises a matrix 138 of NP photodiodes coupled to a system 140 of N time lag registers each having P points, whereby each register is associated with one column of the matrix 138 of photodiodes. A clock 142 makes it possible to transfer the signals supplied by the NP photodiodes to NP cells of registers 140. The network also comprises a supplementary charges coupled device 144 with N points, each point being associated with one of the charges coupled devices 140. A second clock 146 makes it possible to individually transfer the contents of the charges coupled devices 140 to device 144.

When the contents of the last cells of the different registers 140 have been transferred to register 144, a third clock 148 controls the transfer of said contents to the external circuits. In this way the already described signal 26 is obtained at output 150. When a complete line has been analysed in this way, clock 146 supplies a new pulse which advances by one step the content of registers 140 and transfers into register 144 a new series of signals which are then transmitted to the processing circuits by clock 148.

Therefore the frequency of clock 142 corresponds to the image scanning frequency, that of clock 146 to the line scanning frequency and that of clock 148 to the frequency of the peaks of signal 26.

Such a scanning analysis network is also known and is used particularly in television. The circuit marketed by the American Fairchild Corporation of type CCD 202 and having 100 vertical registers of 100 points each can advantageously be used. Naturally, the image analysis by such a network can be carried out by sophisticated means such as interline scanning as used in television scanning processes.

Referring now to FIGS. 3 and 4, it can be seen that it is preferable to give the network different dimensions for the same definition, so that they precisely analyse the same portion of the object. Thus, if they have the same dimension the network placed in plane 17 is struck by a wider image than that placed in plane 16 and the signals supplied by the networks do not precisely correspond to the same images.

Obviously the use of charges coupled devices is only an example and without passing beyond the scope of the present invention it is possible to use any other time lag register.

Figure 9:
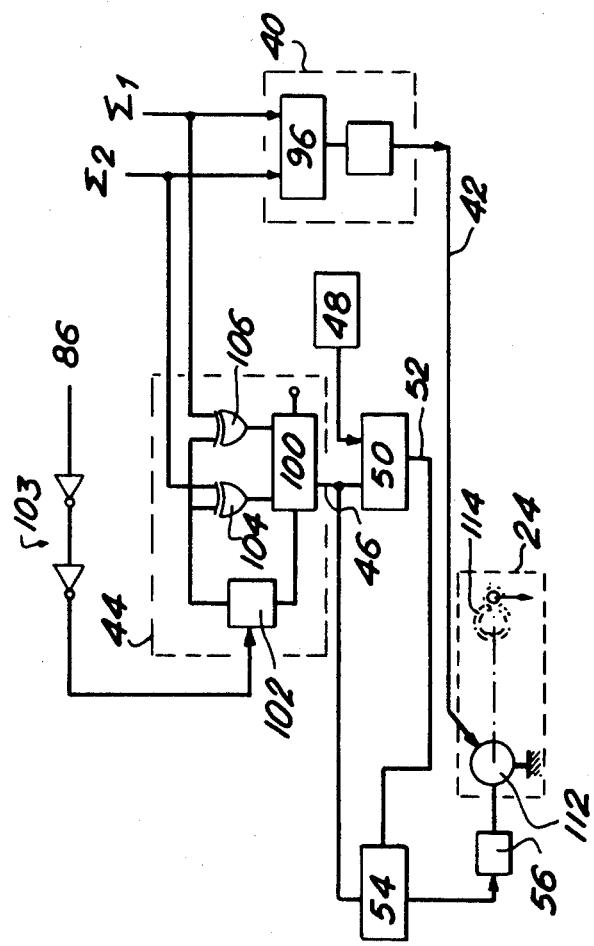
FIG. 9, a diagram of the control means for a focusing correction motor in a first variant using a signal proportional to the variation between sums $\Sigma_1$ and $\Sigma_2$.

In the description given hereinbefore the focusing correction means received a signal which is a function of the variation between $\Sigma_1$ and $\Sigma_2$. In a simple variant this correction signal may be proportional to the difference $\Sigma_1-\Sigma_2$. If the correction means comprise a motor, the latter therefore rotates by a quantity proportional to said variation, the rotation direction being imposed by the polarity of the correction signal. This variant is illustrated by the circuit of FIG. 9.

The comparison between the sums $\Sigma_1$ and $\Sigma_2$ is carried out in a comparator circuit 40 which is constituted by a digital comparator circuit 96 and by a memory flip-flop circuit 98. The digital comparator circuit 96 supplies a signal whose polarity is dependent on relative magnitudes of sums $\Sigma_1$ and $\Sigma_2$. At the end of each line scanning, the end of scanning signal carried by connection 23 controls the memory flip-flop 98 which at its output 42 emits a signal whose polarity, or in more general terms logic state gives the rotation direction of a motor 112 belonging to the focusing correction means 24.

The amplitude of this correction is given by a comparator circuit 44 which comprises a subtraction circuit 100, a memory flip-flop circuit 102 and two OR-EXCLUSIVE gates 104 and 106 controlled by flip-flop circuit 102 which is itself controlled by a signal carried on time lag line 86 referred to in FIG. 6 and delayed by the inversion gates 103. Output 46 of circuit 44 carries a signal which is proportional to the variation $\Sigma_1-\Sigma_2$ which constitutes the error signal used for controlling the rotation of motor 112.

In practice it is advantageous to use a threshold system having a threshold display circuit 48, for example with coding wheels, which supplies the threshold signal to a comparator 50 which simultaneously receives the error signal via connection 46. When this error signal is higher than the threshold supplied by the coding wheel system 48, the output 52 of comparator 50 carries a motor rotation control signal via a counting scale 54 and a control authorisation circuit 56.

The invention is not limited to the case where the control signal is proportional to the variation between $\Sigma_1$ and $93_2$ but in more general manner also covers cases where the control signal is a function of said variation, said function not necessarily being a proportionally relationship. It is possible, for example, to use a correction signal formation circuit comprising means for producing pulses of constant amplitude independent of the value of the difference $\Sigma_1-\Sigma_2$, said pulses being directed through a logic gate to a motor and means for locking said gate when focusing is optimum and thus stopping the rotation of the motor. Moreover, said circuit must have a means for determining the motor rotation direction. This is constituted, for example, by a bistable flip-flop circuit whose state determines the direction. Such circuit is shown in FIG. 10.

Figure 10:
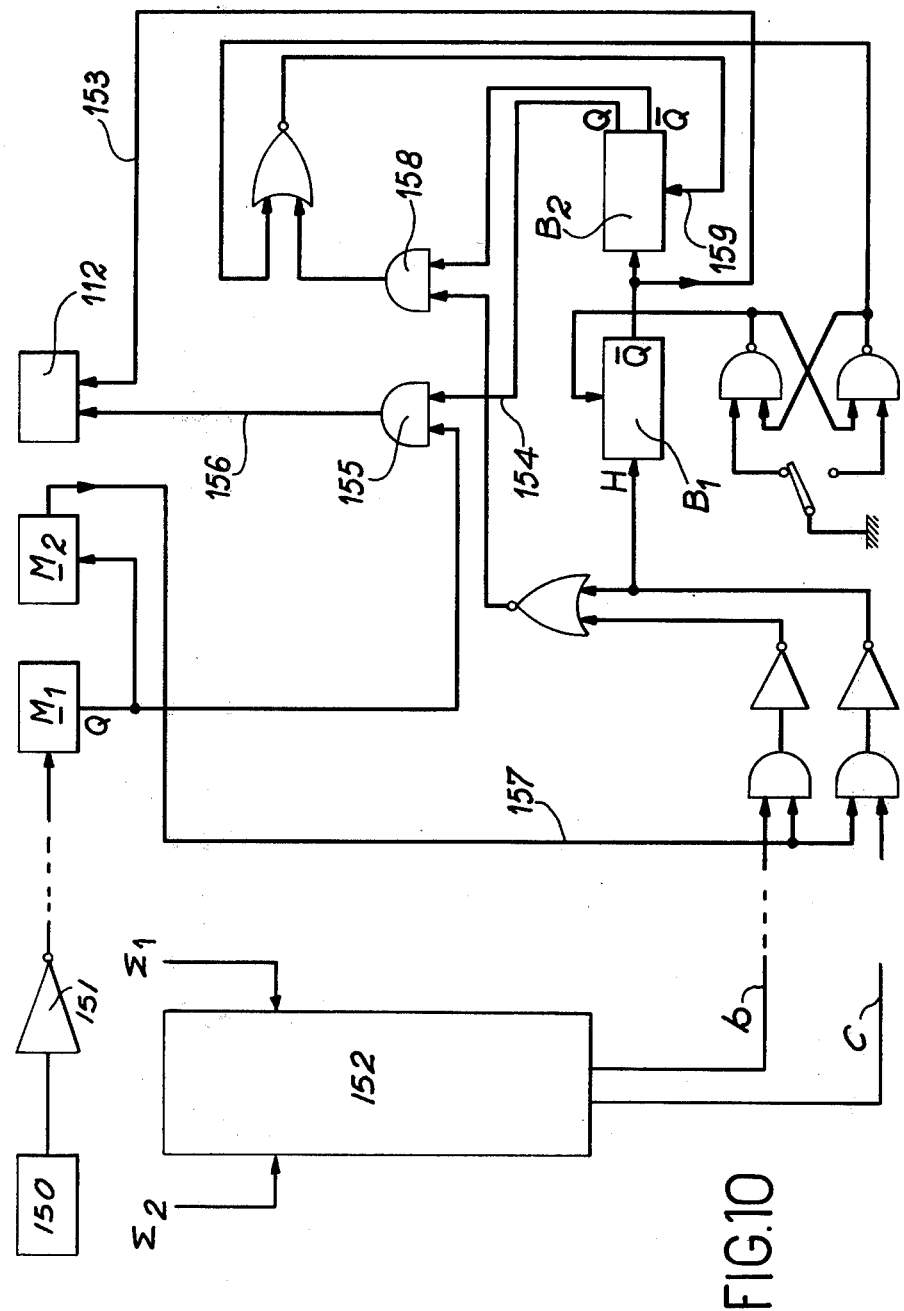
FIG. 10, a diagram of a circuit permitting the control of the correction motor with amplitude pulses independent of the variation between $\Sigma_1$ and $\Sigma_2$.

The circuit shown in FIG. 10 comprises a circuit 150 producing rectangular control pulses (this circuit may, for example, comprise a so-called "Schmidt trigger"), two monostable circuits in series $M_1$, $M_2$, the first controlled by pulses emitted by circuit 150 inverted by an inverter 151, a digital comparator 152 which receives digital signals $\Sigma_1$ and $\Sigma_2$ and which has two outputs b, c assigned to the two possible cases of relative positioning of the two signals $\Sigma_1$ and $\Sigma_2$ applied to the two inputs. If $A<B$, output b is at "1" and if $A>B$, output c is at "1". The circuit shown comprises in addition two binary flip-flops $B_1$ and $B_2$ arranged in series, whereby an output $\overline{Q}$ of $B_1$ is connected to a connection 153 which carries a signal whose polarity (or more generally logic state) determines the rotation direction of focusing correction motor 112. The signal which appears at output Q of flip-flop $B_2$ is applied by connection 154 to the input of a logic gate 155 of the AND type connection to the output Q of monostable circuit $M_1$. The output 156 of gate 155 carries the control pulses applied by monostable circuit $M_1$ to motor 112. Finally, an AND gate 158 has an input connected to output $\overline{Q}$ of flip-flop $B_2$, whilst the other input is connected to outputs b and c of the comparator via logic gates represented by their conventional symbols.

This circuit operates in the following manner. Motor 112 is controlled by pulses from monostable circuit $M_1$ which have an amplitude and duration which are independent of the variation between the two sums $\Sigma_1$ and $\Sigma_2$. The motor is stopped by closing gate 155. Flip-flop $B_1$ is used to determine the rotation direction of motor 112.

In more specific terms two cases are possible:
(1) The disparity between $\Sigma_1$ and $\Sigma_2$ is such that comparator 152 supplies a "1" at its connection c. This signal is applied via logic gates to the clock input H of flip-flop $B_1$ which changes state. This change of state modifies the state of output $\overline{Q}$ and consequently the signal carried by connection 153 which fixes the rotation direction of the motor, so that said direction is reversed. The motor rotates by a series of equal angles while a sum is obtained, for example $\Sigma_1$, which is higher than the sum $\Sigma_2$, indicating that focusing is improving. When a sum $\Sigma_1$ lower than sum $\Sigma_2$ is obtained, this means that focusing is deteriorating. The disparity produces a change of state of flip-flop $B_1$ which changes the rotation direction of the motor and better focusing is obtained. However, this change of state of flip-flop $B_1$ leads to the change of state of flip-flop $B_2$ and consequently to the change of state of output Q which passes from "1" to "0". The passage to "0" of output Q of flip-flop $B_2$ locks AND gate 155 and the motor no longer receives control pulses. It stops rotating and focusing can be considered as good.

(2) The disparity between $\Sigma_1$ and $\Sigma_2$ is such that comparator 152 supplies a "1" at its connection b, which means that the motor rotation direction is correct and that focusing improves. Flip-flop $B_1$ does not change state and the rotation of the motor continues until, as in the previous case, the change in direction of the disparity detected by comparator 152 changes the state of flip-flop $B_1$. The motor rotation direction is reversed and after several rotations increasing sums are obtained. On again obtaining a sum $\Sigma_1$ which is below sum $\Sigma_2$, it is clear that the optimum zone has been crossed. Flip-flop $B_1$ changes state bringing about the change of state of the second flip-flop $B_2$ whose output Q passes to "0" which locks gate 155. The motor no longer receives control pulses and focusing is completed.

The circuit of FIG. 9 also comprises means for permitting the restarting of the motor when sums $\Sigma_1$ and $\Sigma_2$ are modified as a result of the focus control changing, or as a result of a change in the object under observation. If this occurs comparator 152 emits a disparity pulse which is finally applied to the input of a gate 158 controlled by output $\overline{Q}$ of flip-flop $B_2$. In the hypothesis that the motor is stopped so that gate 155 is locked, output Q of flip-flop $B_2$ is at "0" and output $\overline{Q}$ at "1". Therefore the AND gate 158 is open. The pulse emitted by comparator 152 can then cross gate 158 and reach flip-flop $B_2$ via its so-called pre-set input 159. Therefore flip-flop $B_2$ changes state which unlocks gate 155 and again gives the control pulses access to the motor. The process analysed hereinbefore is then reproduced in the different cases.

The invention is not limited to the embodiments described and represented hereinbefore and various modifications can be made thereto without passing beyond the scope of the invention.

What is claimed is:

1. A process for the automatic correction of the focusing of a microscope in an image plane wherein:
   two images of the same object are formed through two microscope outputs, said two images being formed in two different planes surrounding the image plane;
   the light intensity of the different points of the two images is detected by means of two photo-detector matrices;
   on the basis of the signals contained in each of the photo-detectors the contrast of the two images is measured;
   the two measured contrasts are compared;
   a correction signal is produced which is a function of the variation between the said two contrasts;
   by means of the said signal the microscope focusing correction means are operated so as to eliminate the variation wherein for measuring the contrast of an image from signals contained in photodetectors:
   the signals contained in each of the photodetectors are transferred in a time lag register to the same number of cells as there are photodetectors;
   the contents of the register cells are read out;
   an analogue envelope signal is formed from the read-back signals;
   an analogue to digital conversion is performed of said envelope signal and a sequence of digital samples is obtained;
   the absolute values of the increment between each sample and the next is calculated;
   the absolute values of the increments are summated which gives a signal representing the contrast.

2. A process according to claim 1 wherein correction means are provided and comprise a motor, whereby the rotation of said motor is controlled by producing a fixed amplitude signal which is transmitted to the motor whilst the variation between the contrasts is not zero.

3. An apparatus for the automatic correction of the focusing of a microscope in an image plane wherein it comprises:
   two microscope outputs forming two images of the same object in two different planes surrounding said image plane;
   two matrices with at least one line of N photodetectors receiving the two images formed by the microscope;
   a contrast measuring circuit of each image associated with each matrix;
   a comparator of the signals supplied by the two contrast measuring circuits;
   a circuit for the formation of a correction signal connected to the output of the comparator;
   means for correcting the focusing of the microscope controlled by said signal wherein each matrix of photodetectors is associated with:
   a time lag register with N cells associated with means for transferring the signals of the photodetectors into cells of said time lag register;
   a reading circuit of the N contentents of the register cells;
   and wherein each contrast measuring circuit comprises:
   a circuit for forming an analogue envelope signal from the N read-back signals;
   an analogue digital converter receiving said envelope signal and supplying a sequence of digital samples;
   a circuit for measuring the absolute value of the increment between each sample and the next;
   a digital summator of the absolute values of the increments.

4. An apparatus according to claim 3, wherein the focusing correction means comprises a motor, the correction signal formation circuit comprising means for producing fixed amplitude pulses, a logic gate through which said pules are directed to the motor, means for locking the logic gate when focusing is optimum and thus stopping the rotation of the motor, a bistable flip-flop circuit whose state determines the rotation direction of the motor, and means for modifying the state of the flip-flop as a function of the direction of the disparity between two successive sums.

5. An apparatus according to claim 3, wherein the circuit for measuring the absolute value of the increment between one sample and the next comprises:
- a digital adder with two inputs, a signal output and a hold output;
- a first OR-EXCLUSIVE gate with two inputs whose output is connected to one of the inputs of the adder;
- a second OR-EXCLUSIVE gate with two inputs whose output is connected to the other input of the adder;
- a time lag register with one input connected to the output of the analogue-digital converter and one output connected to one of the inputs of the second OR-EXCLUSIVE gate;
- a memory flip-flop with one input connected to the hold output of the adder and one output connected directly to the other input of the second OR-EXCLUSIVE gate and via an inverter to an input of the first OR-EXCLUSIVE gate whose other input is connected to the converter output.

6. An apparatus according to claim 3, wherein the two time lag registers are of the charges coupled device type.

7. An apparatus according to claim 3, wherein each photodetector matrix is a photodiode matrix with P lines and N columns, said photodiode matrix being coupled to a system of N charges coupled devices with P points, each charges coupled device being coupled to a photodiode column of said matrix and wherein each output has a supplementary charges coupled device with N points, whereof each point is connected to the output of one of said charges coupled devices.

* * * * *